G. P. RITTER.
COUPLING AND YOKE CONNECTION.
APPLICATION FILED AUG. 24, 1920.
1,404,892.
Patented Jan. 31, 1922.
2 SHEETS—SHEET 2.
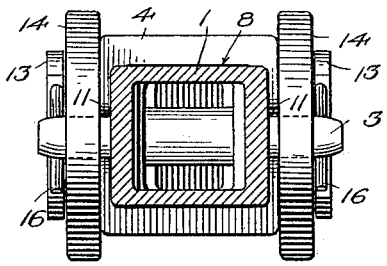
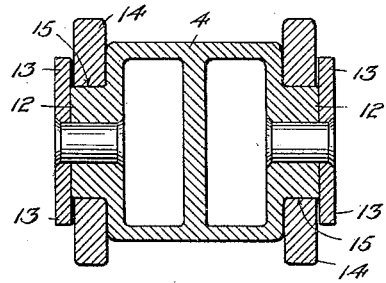
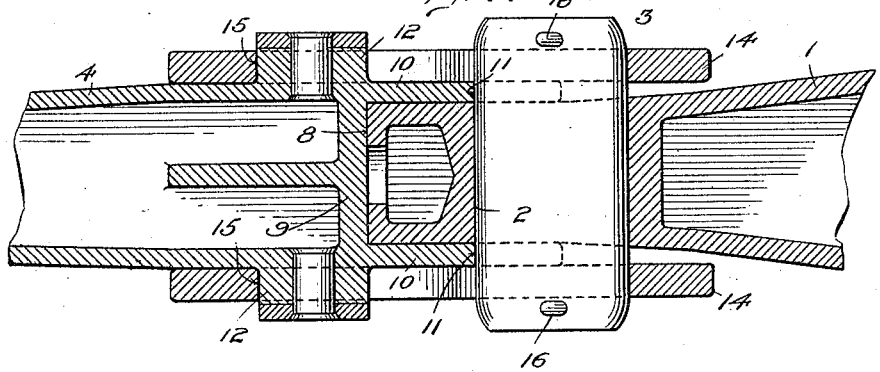
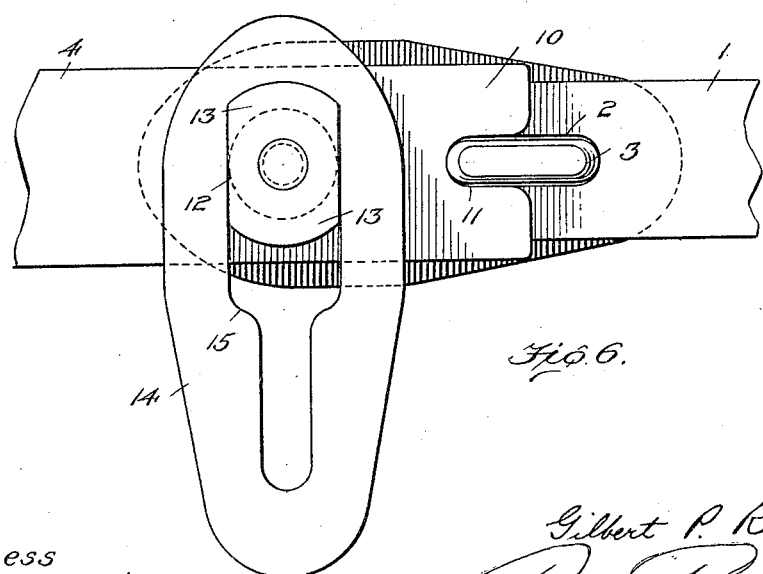
Witness
Edwin L. Bradford
Inventor
Gilbert P. Ritter
By Ritter & Ritter
his Attorneys

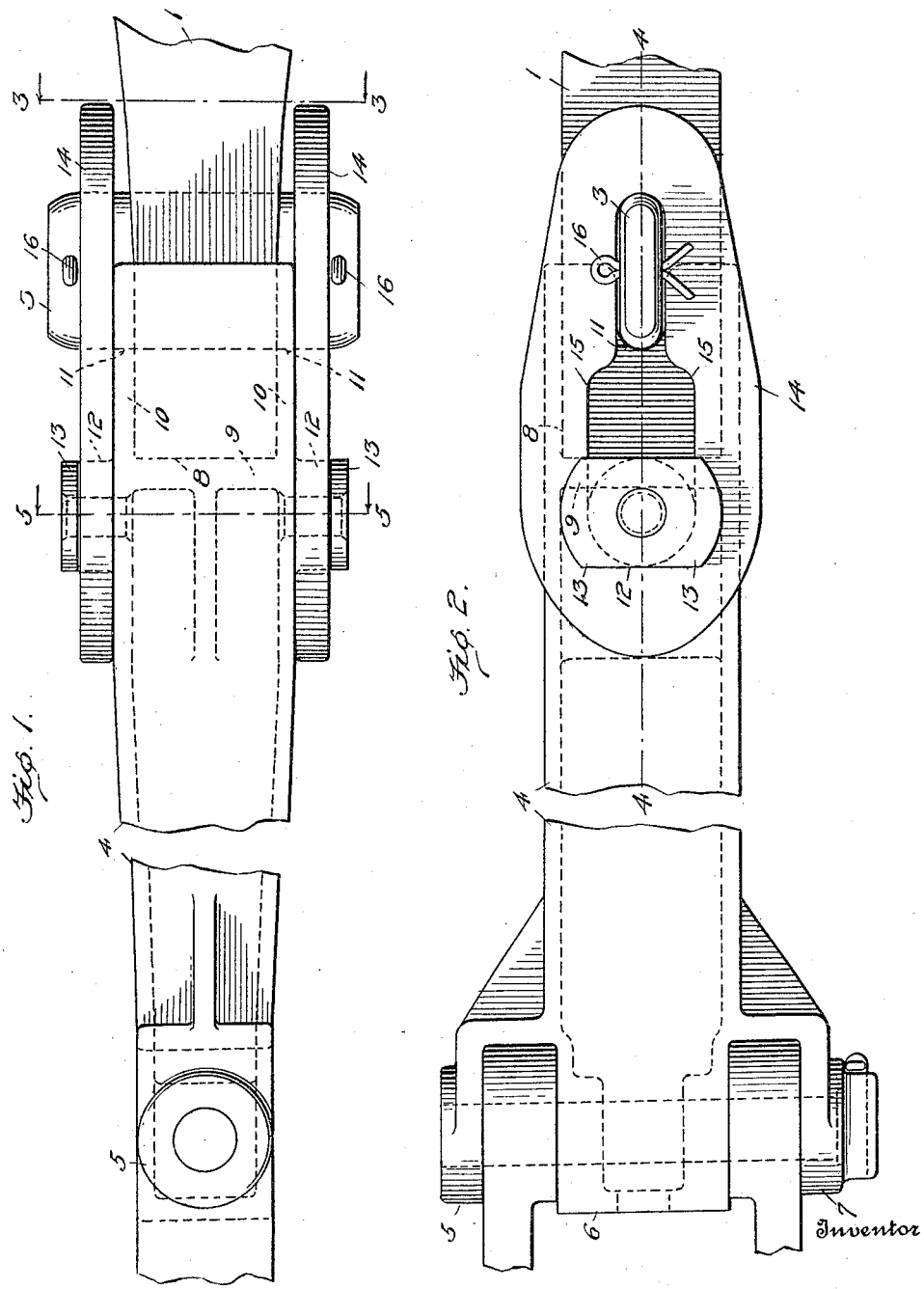

UNITED STATES PATENT OFFICE.

GILBERT P. RITTER, OF WASHINGTON, DISTRICT OF COLUMBIA, ASSIGNOR TO THE McCONWAY & TORLEY COMPANY, OF PITTSBURGH, PENNSYLVANIA, A CORPORATION OF PENNSYLVANIA.

COUPLER AND YOKE CONNECTION.

1,404,892.          Specification of Letters Patent.      Patented Jan. 31, 1922.

Application filed August 24, 1920. Serial No. 405,687.

*To all whom it may concern:*

Be it known that I, GILBERT P. RITTER, a citizen of the United States, residing at Washington, in the District of Columbia, have invented certain new and useful Improvements in Coupler and Yoke Connections; and I do hereby declare the following to be a full, clear, and exact description of the invention, such as will enable others skilled in the art to which it appertains to make and use the same.

My invention relates to a coupler and yoke connection whereby couplers which are not primarily designed to have a swinging movement with respect to the cars upon which they are mounted may be pivotally attached to the yoke of the draft rigging so as to be capable of extended lateral swinging movements when the train passes around curves.

The principal object of the invention is to provide a simple, durable, efficient and compact construction for accomplishing the purpose indicated.

Generally stated, this object is effected by connecting to the stem of a car coupler a coupler stem extension adapted to be pivotally attached to a draft yoke and having means for preventing longitudinal movement of the coupler stem with respect to the coupler stem extension in buffing, and by transmitting draft forces from the coupler stem to the coupler stem extension through a plurality of links which are movably mounted upon the coupler stem extension and receive a transversely extending key which passes through a slot adjacent the rear end of the coupler stem.

In the drawings illustrating the preferred embodiment of the invention, the scope whereof is pointed out in the claims,—

Figure 1 is a plan view of a device embodying the invention, the forward portion of the coupler and a portion of the coupler stem extension being omitted.

Figure 2 is a side elevation of the construction shown in Fig. 1.

Figure 3 is a transverse section on the line 3—3, Fig. 1.

Figure 4 is a horizontal section on the line 4—4, Fig. 2.

Figure 5 is a section on the line 5—5, Fig. 1.

Figure 6 is a view corresponding to Fig. 2, but illustrating one of the links in the position which they assume after having been disengaged from the connecting key in the operation of disconnecting the coupler from the coupler stem extension.

In the drawings, 1 indicates the stem of a car coupler. It is provided adjacent its rear end with a transversely extending slot 2 through which a correspondingly shaped key 3 extends.

The coupler stem extension 4, the intermediate portion of which may be conveniently made of hollow rectangular cross section, is preferably provided at its rear end with a plurality of spaced pivot lugs 5, 6 and 7, respectively, which are adapted to receive between them and to be pivotally attached to a draft yoke (not shown), in a well known manner. The forward end of the coupler stem extension 4 is fashioned with a forwardly opening socket 8 which receives the rear end of the coupler stem 1. The transversely extending web 9 forming the rear wall of the socket 8 is adapted to engage the rear end of the coupler stem and form a bearing through which buffing shocks imparted to the coupler are communicated to the coupler stem extension. The side walls 10 of the socket are provided with forwardly opening recesses 11 into which the rear portion of the key 3 extends when the parts are in assembled relation.

Extending outwardly from opposite sides of the coupler stem extension are projections 12 which preferably are formed integral with the extension member 4 and have enlarged outer ends, such enlargements being preferably constituted by vertically alined segmental flanges 13. Pivotally mounted upon the respective trunnions 12 are links 14 through the outer ends of which the key 3 extends. The rear portions 15 of the slots or apertures in the links are made of sufficient width to permit the passage of the trunnions 12 when the links are in a vertical position. As illustrated in Fig. 6, the links 14 automatically rotate under the influence of gravity on their trunnions 12 and assume a vertical position when the support of the transversely extending key is withdrawn from them. When the links are in a vertical position they may be disconnected from the coupler extension 2 by lifting them a distance sufficient to permit the upper flanges 13 of the trunnions to pass through the openings in the links. When the parts are in assembled position the flanges 13 maintain the links in assembled relation to the trunnions; and the said flanges 13 also prevent accidental disconnection of the links 14 from the trunnions when the key 3 has been disengaged from the links and the latter hang down. The key 3 may be retained in assembled relation by means of cotters 16 passing therethrough outside of the links 14

In attaching the coupler stem 1 to the coupler stem extension 4 the key 3 is placed in the slot 2 in the rear end of the coupler stem and the latter is inserted in the socket 8 of the coupler stem extension. The key 3 is then pushed sidewise until one of the links 14 may be swung upwardly to a position enabling the key to be entered in the forward end of the slot in the link. The key is then slid sidewise in the opposite direction until the link 14 upon the opposite side of the coupler can be raised to a position bringing its slot in alinement with the key, which latter is then moved endwise until it extends through both of the links. The cotters 16 are then inserted. The coupler stem may be disconnected from the coupler stem extension 4 by performing these operations in the reverse order, each link 14, as it is freed from disengagement with the key 3, swinging downwardly to the vertical position illustrated in Fig. 6.

It will be appreciated that the operations of connecting and disconnecting the coupler are very simple and may be performed without special tools, and that by using a short key 3 the construction dispenses with the necessity of cutting holes through the draft sills or center sills of the car (not shown).

I claim:—

1. In a device of the character indicated, the combination with a coupler having a stem provided with a slot adjacent its rear end, of a coupler stem extension having at its forward end a socket adapted to receive the rear end of said coupler stem, a key extending through said slot, and a plurality of links rotatably mounted on said coupler stem extension and connecting said coupler stem and coupler stem extension through said key.

2. In a device of the character indicated, the combination with a coupler having a stem provided with a slot adjacent its rear end, of a coupler stem extension, a plurality of links rotatably mounted on said coupler stem extension, and a key extending through said slot and said links.

3. In a device of the character indicated, the combination with a coupler having a stem provided with a slot adjacent its rear end, of a coupler stem extension having oppositely disposed trunnions, links respectively mounted upon and adapted to be rotated with respect to said trunnions, and a key extending through said slot and links.

4. In a device of the character indicated, the combination with a coupler having a stem provided with a slot adjacent its rear end, of a coupler stem extension provided with oppositely disposed trunnions having flanged outer ends, links respectively mounted on said trunnions and normally maintained thereon by said flanges, and a key extending through said slot and said links.

5. In a device of the character indicated, the combination with a coupler having a stem provided with a slot adjacent its rear end, of a coupler stem extension, a plurality of links mounted on said coupler stem extension and independently rotatable with respect thereto, and a key extending through said slot and said links.

6. In a device of the character indicated, the combination with a coupler stem having a slot adjacent its rear end, of a coupler stem extension having oppositely disposed trunnions each provided with a segmental flange, links respectively mounted on said trunnions and normally overlapping the respective flanges, and a key extending through said slot and said links.

7. In a device of the character indicated, the combination with a coupler stem, of a coupler stem extension, a plurality of links mounted on said coupler stem extension and independently rotatable with respect thereto without detachment therefrom, and key means connecting said links to said coupler stem.

8. In a device of the character indicated, the combination with a coupler stem, of a coupler stem extension connected thereto and adapted to be pivotally connected to a draft yoke, means for preventing longitudinal movement of said coupler stem with respect to said coupler stem extension in buffing, and means for transmitting draft forces from said coupler stem to said coupler stem extension, said last named means including a plurality of links rotatably mounted on said coupler stem extension.

9. In a device of the character indicated, the combination with a coupler stem having a slot adjacent its rear end, of a coupler stem extension having at its forward end a socket adapted to receive the rear end of said coupler stem, the rear wall of said socket being adapted to engage the rear end of said coupler stem and the side walls of said socket being provided with forwardly opening key receiving recesses, a plurality of links, means for connecting said links to said coupler stem extension, and a key extending through said slot, key receiving recesses and links.

10. In a device of the character indicated, the combination with a coupler stem having a slot adjacent its rear end, of a coupler stem extension having at its forward end oppositely disposed portions which are adapted to receive the rear end of said coupler stem between them, said oppositely disposed portions being provided with forwardly opening recesses, and devices for detachably connecting said coupler stem and coupler stem extension, said devices including means extending through said slot and through said forwardly opening recesses.

11. In a device of the character indicated, the combination with a coupler stem having a slot adjacent its rear end, of a coupler stem extension adapted to be connected to a draft yoke, a plurality of links connected to said coupler stem extension, and a key extending through said slot and links, said links being adapted to move from assembled position when said key is disengaged therefrom.

12. In a device of the character indicated, the combination with a coupler stem, of a coupler stem extension, and means for connecting said coupler stem and coupler stem extension, said means including a key and means adapted to be retained in assembled position by engaging said key and to move automatically from assembled position when said key is disengaged therefrom.

13. In a device of the character indicated, the combination with a coupler stem having a slot adjacent its rear end, of a coupler stem extension having oppositely disposed projections provided with enlarged outer ends, links rotatably mounted upon said projections, and a key passing through said slot and said links, the openings in said links being adapted to permit the passage of the enlarged ends of said projections when said links and projections are in a given relative position, and the enlarged ends of said projections normally serving to maintain said links in connected relation to said coupler stem extension.

In testimony whereof I affix my signature.

GILBERT P. RITTER.